United States Patent [19]
Goldberg et al.

[11] Patent Number: 6,076,092
[45] Date of Patent: *Jun. 13, 2000

[54] SYSTEM AND PROCESS FOR PROVIDING IMPROVED DATABASE INTERFACING USING QUERY OBJECTS

[75] Inventors: Robert N. Goldberg, Redwood City; Chung V. Le, San Jose, both of Calif.

[73] Assignee: Sun Microsystems, Inc., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/914,398

[22] Filed: Aug. 19, 1997

[51] Int. Cl.$^7$ ............................................. G06F 17/30

[52] U.S. Cl. .................... 707/103; 707/104; 364/231; 345/346

[58] Field of Search ................... 707/3, 4, 5, 103, 707/102, 104, 10, 200, 9, 533, 2; 395/200, 704; 364/231, 234, 237, 242, 235; 345/346, 433

[56] References Cited

U.S. PATENT DOCUMENTS

| | | | |
|---|---|---|---|
| 5,161,225 | 11/1992 | Abraham et al. | 707/103 |
| 5,799,313 | 8/1998 | Blackman et al. | 707/103 |
| 5,809,508 | 9/1998 | Blackman et al. | 707/103 |
| 5,809,509 | 9/1998 | Blackman et al. | 707/103 |

Primary Examiner—Wayne Amsbury
Assistant Examiner—Thu-Thao Havan
Attorney, Agent, or Firm—Kudirka & Jobse LLP

[57] ABSTRACT

A system and a process for providing improved interfacing to a data source storing a plurality of data using query objects are described. The data source includes a schema describing organization of the data within the data source and an interface defined in a query language. A set of data manipulations are encapsulated in the query object and implemented in the query language. Each such encapsulated data manipulation conforms to the schema of the data source. A connection is handled via the interface between the query object and the data source. At least one such encapsulated data manipulation is performed on the data source in response to a request from a client. A resultant set of the data received in response to the at least one such data manipulation from the data source is processed. The resultant set of the data is provided as pre-determined data types to the client.

35 Claims, 9 Drawing Sheets

SYSTEM AND PROCESS FOR PROVIDING IMPROVED DATABASE INTERFACING USING QUERY OBJECTS

FIELD OF THE INVENTION

The present invention relates in general to object database servers and, in particular, to a system and process for providing improved database interfacing using query objects.

BACKGROUND OF THE INVENTION

Presently, database environments are predominately based on a two-tiered model consisting of one or more applications in a top tier which access a database management system (DBMS) server in the bottom tier. Each application sends queries to the DBMS server which processes the queries and returns results sets. The two-tiered model suffers from several drawbacks. First, the queries must be formulated in a DBMS-specific query language, such as Structured Query Language (SQL), known to the server. Often the query language is non-standard as a result of proprietary extensions made to the basic query language. As a result, queries are often non-portable between different DBMS servers. Second, commonly performed routines must be replicated between peer applications since each application functions autonomously from its peers. The replication results in poor code re-use and duplication of functions.

Consequently, there is a trend towards a three-tiered model for database environments. Generally, the top tier consists of clients, the middle tier consists of application or business logic and the bottom tier consists of DBMS servers. In this model, the applications are implemented as "thin" clients with the commonly performed routines consolidated into the middle tier as the business logic. Since the business logic is shareable between the clients, code replication is avoided. The Common Object Request Broker Architecture (CORBA) presents one object-oriented approach to forming a three-tiered database environment, such as described in R. Orfali et al., "The Essential Client/Server Survival Guide," pp. 375–458, John Wiley & Sons, Inc. (2d ed. 1996), the disclosure of which is incorporated herein by reference.

Existing DBMS access mechanisms and tools, including fourth generation languages (4GLs) and application programmer interfaces (APIs), are designed for the two-tiered model and are ill-suited for use in the three-tiered model. The construction of business logic for the middle tier is particularly difficult and several work-around approaches exist.

One prior art approach to interfacing to a database server in a three-tiered model uses database objects, such as licensed by I-Kinetics, Inc. Each database object is implemented as a middle tier server that passes an API for the DBMS from the DBMS server to the database object. The clients pass queries into the database object via the API and receive results sets back. This approach provides the full power of the DBMS query engine to the applications, but provides no abstraction from the query engine. Thus, the applications are tied to the query language and schema of the DBMS. The database objects approach is further described hereinbelow with reference to FIG. 2 in the Detailed Description.

Another prior art approach to interfacing to a database server in a three-tiered model uses active data object, such as licensed by Persistence, Inc. Each active data object is implemented in the middle tier for use by other objects also in the middle tier. Data from the database is mapped into each active data object which perform the actual queries to the database. This approach provides substantial abstraction by limiting what the application "sees" to only the resultant objects. However, active data objects give up most of the power of the query engine, such as for summarizing data mapped to large numbers of objects. The active data objects approach is further described hereinbelow with reference to FIG. 3 in the Detailed Description.

Therefore, there is a need for an approach to providing improved database interfacing in a three-tiered model. Such an approach would abstract the queries and schema of the bottom tier DBMS server without giving up the full power of the query engine. The approach could preferably be generalized to operate on other forms of organized data, including relational, hierarchical and other formal databases to simple flat files.

There is a further need for an approach to interfacing to a DBMS in a distributed computing environment using object oriented programming technologies. Such an approach would preferably encapsulate the DBMS query language, database schema and DBMS API from the application, thereby enabling the data object layer to be bypassed.

SUMMARY OF THE INVENTION

The present invention enables the above problems to be substantially overcome by providing improved database interfacing using query objects. Each query object is a server object that translates client requests into appropriate queries for the database, issues those queries and returns the results as strongly typed data values.

An embodiment of the present invention is a system and a process for providing improved interfacing to a data source storing a plurality of data using query objects. The data source includes a schema describing organization of the data within the data source and an interface defined in a query language. A set of data manipulations are encapsulated in the query object and implemented in the query language. Each such encapsulated data manipulation conforms to the schema of the data source. A connection is handled via the interface between the query object and the data source. At least one such encapsulated data manipulation is performed on the data source in response to a request from a client. A resultant set of the data received in response to the at least one such data manipulation from the data source is processed. The resultant set of the data is provided as predetermined data types to the client.

Still other embodiments of the present invention will become readily apparent to those skilled in the art from the following detailed description, wherein is shown and described only the embodiments of the invention by way of illustration of the best modes contemplated for carrying out the invention. As will be realized, the invention is capable of other and different embodiments and several of its details are capable of modification in various obvious respects, all without departing from the spirit and scope of the present invention. Accordingly, the drawings and detailed description are to be regarded as illustrative in nature and not as restrictive.

DETAILED DESCRIPTION

I. System for Providing Improved Database Interfacing Using Quary Objects

A. System Components

Figure 1:
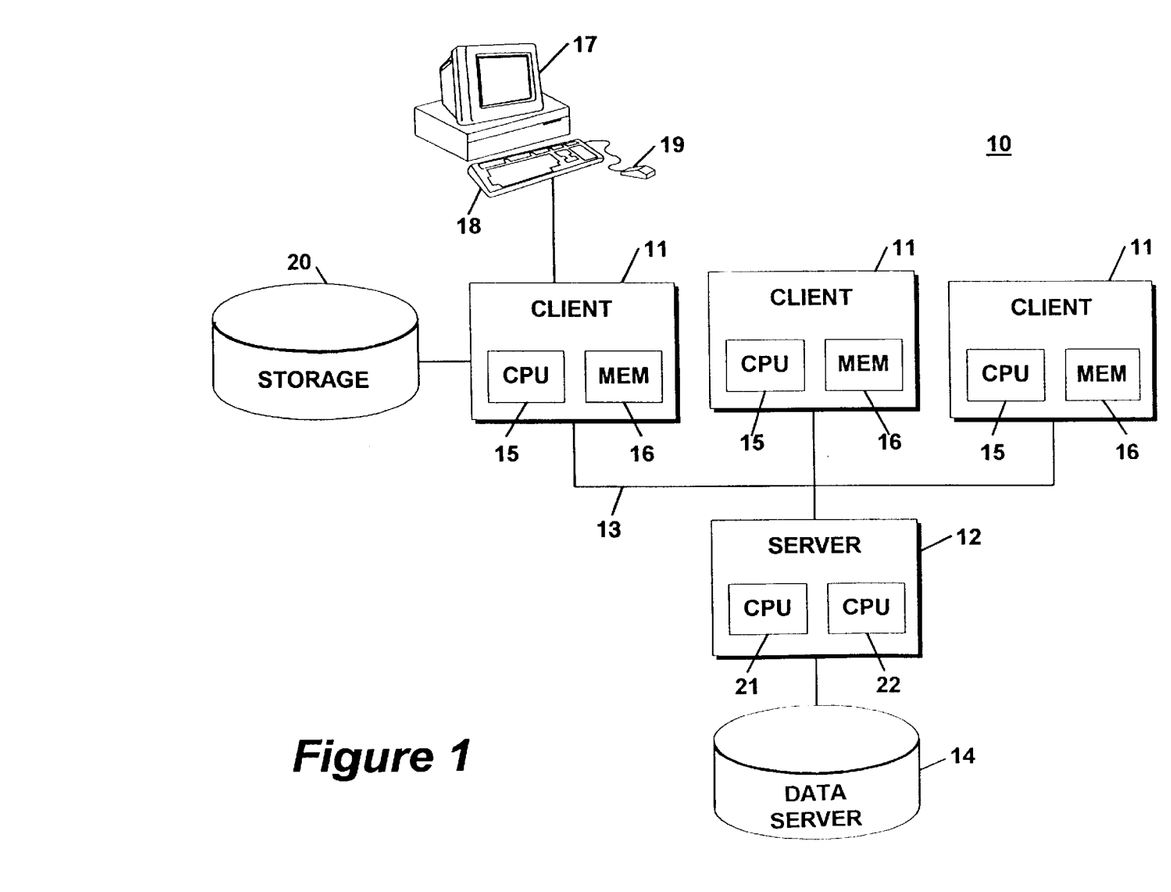
FIG. 1 is a block diagram of a system for providing improved database interfacing using query objects according to the present invention.

FIG. 1 is a block diagram of a system 10 for providing improved database interfacing using query objects according to the present invention. As shown, the system 10 is a distributed computing environment comprising a plurality of individual computer nodes 11, 12. The nodes are functionally organized into clients 11 and at least one server 12 interconnected over a network 13. However, the clients 11 and server 12 can also be implemented on a single node. Each node, whether a client 11 or server 12, is a conventional programmed digital computer, respectively including a central processing unit (CPU) 15, 21, and a main memory 16, 22 interconnected with the CPU 21, 22. In addition, each client 11 and server 12 can include user interfacing devices, such as a monitor 17, keyboard 18 and mouse 19 and a storage device 20 (shown in FIG. 1, by way of example, for just one client 11). The server 12 includes a data source 14, such as a database, file system or other organized data storage system. The individual components implementing each node 11, 12 are interconnected over a central system bus (not shown) used for exchanging address, data and control signals, although other forms of component interconnections are possible. Finally, the system 10 can include devices for accepting computer-readable storage mediums (not shown) and can be interconnected with the network 13 for exchanging data and control signals transmitted as a computer data signal in a carrier wave.

In the described embodiment, each node 11, 12 is a networkable computer, such as a Sun SparcStation™ 5 workstation running the Solaris™ operating system, a version of the UNIX® operating system, or an IBM-compatible computer running the Windows NT™ operating system. However, use of the systems and processes described and suggested herein are not limited to a particular computer configuration. SparcStation™ and Solaris™ are trademarks of Sun Microsystems, Inc., Mountain View, Calif. UNIX® is a registered trademark of The Santa Cruz Operation, Santa Cruz, Calif. Windows NT™ is a trademark of Microsoft Corporation, Redmond, Wash. Client/server environments will now be described.

B. Client/Server Environments

Distributed computing environments can be logically viewed as of a set of cooperating software components, referred to as "objects," being executed on one or more computers interconnected by a network. The individual applications running on each computer can share a set of standard or application-specific objects and executing an application can cause it to interact with and use other software objects available locally and throughout the network. Each such object can, in turn, itself use other software objects. Thus, an application in a distributed computing environment can consist of the combination of application-specific objects and the combined local and remote objects it uses. When one object calls an operation on another object, the calling object is referred to as the "client" while the called object is referred to as the "server." Several approaches to structuring client/server environments for performing database manipulation in a three-tiered model will now be described.

Figure 2:
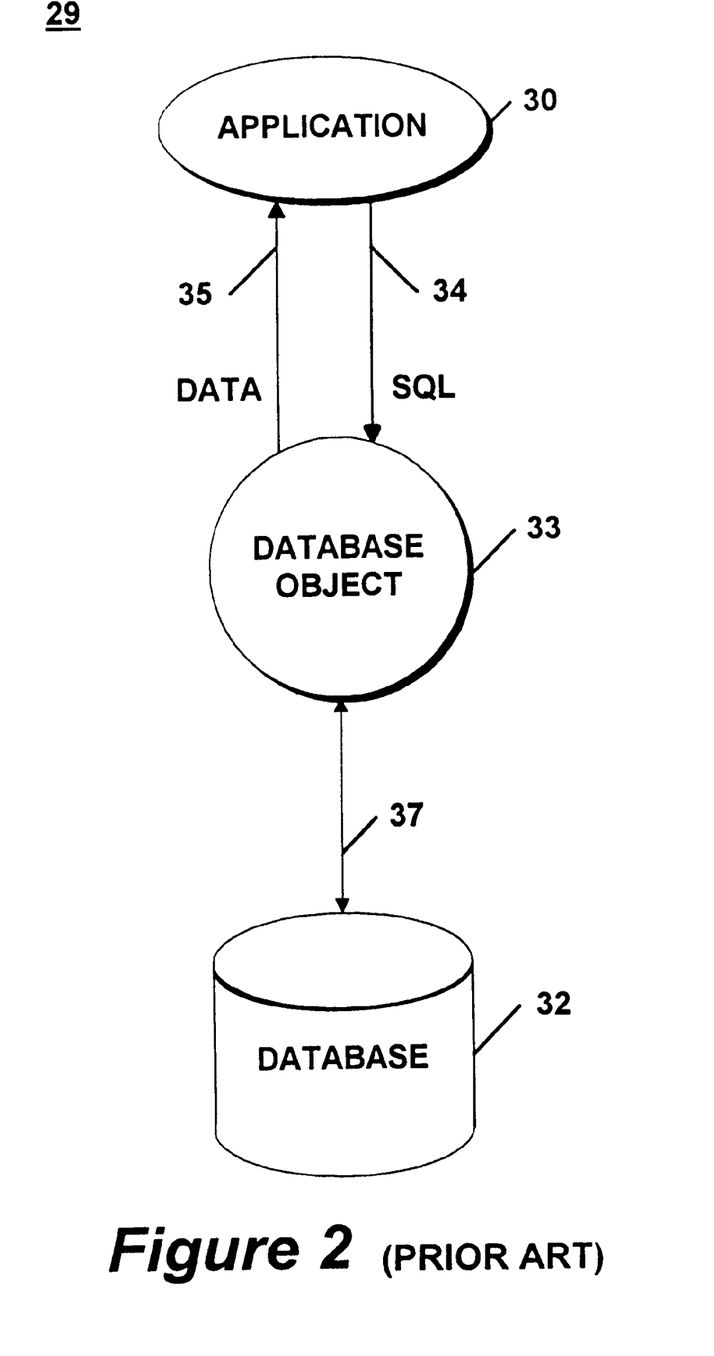
FIG. 2 is a block diagram of a prior art database client/server environment using database objects implemented in the system of FIG. 1.

FIG. 2 is a block diagram of a prior art database client/server environment 29 using database objects 33 implemented in the system 10 of FIG. 1. The environment 29 is functionally structured into three tiers. At the top tier, a client 11 (shown in FIG. 1) executes an application 30. In the middle tier, the business logic is implemented in a database object 33 which can be executed on either a client 11 or a server 12 (shown in FIG. 1). At the bottom tier, a server 12 and an associated data source 14 (shown in FIG. 1) form a database 32 which includes a database management system (DBMS) being executed by the server 12.

During operation, the application 30 interfaces to the database object 33 by passing queries 34 in a DBMS-specific query language, such as SQL, to the database object 33 and receiving back the resultant sets of data 35. The database object 33 logically maps the entire database 32 into a single object with a general interface that functions as an abstract API 37 for the underlying database engine (not shown). Clients of the database object 33, in this case, the application 30, can pass arbitrary queries 34 to the database object 33 and obtain the resultant data 35. The clients need not know what query is actually being issued to the database 32. In turn, the database object 33 functions as a conduit using the abstract API 37 through which the queries 34 are passed to and the resultant data 35 received from the database 32.

The primary advantage of database objects 33 is the ability to provide complete access to the database 32, including the full power of the underlying query language. However, database objects 33 suffer from several drawbacks. First, the client itself must generate the appropriate queries 34 for obtaining the desired results, including formulating the database requests 34 in the native query language for the database 32. Second, the client must "unpack" the resultant data 35 into local variables of known types. Consequently, the application 30 must examine the meta-data describing the columns of the database 32 that are returned and process the resultant data 35 accordingly. Third, database objects 33 must account for differences between particular dialects of the underlying query language used by the database 32. Finally, database objects 33 do not isolate the client from schema changes in the database 32.

Figure 3:
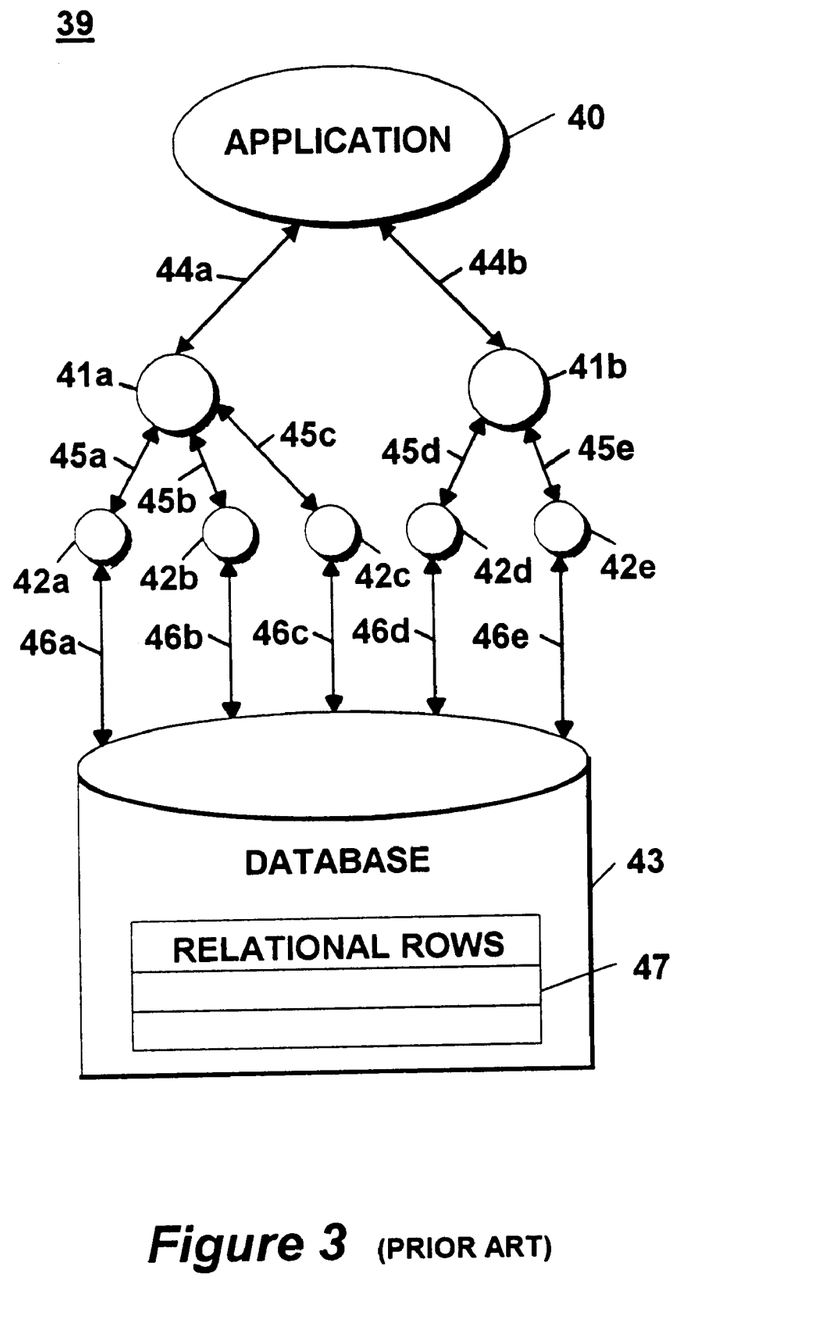
FIG. 3 is a block diagram of a prior art database client/server environment using active data objects implemented in the system of FIG. 1.

FIG. 3 is a block diagram of a prior art database client/server environment 39 using active data objects 42a–e implemented in the system 10 of FIG. 1. The environment 39 is functionally structured into three tiers. At the top tier, a client 11 (shown in FIG. 1) executes an application 40. In the middle tier, the business logic is implemented as business objects 41a–b each respectively interfacing with active data objects 42a–c and 42d–e. Both the business objects 41a–b and the active data objects 42a–e can be executed on either a client 11 or a server 12 (shown in FIG. 1). At the bottom tier, a server 12 and an associated data source 14 (shown in FIG. 1) form a set of relational rows 47 in a relational database 43 which includes a relational database management system (RDBMS) being executed by the server 12.

During operation, the relational rows 47 are mapped into the active data objects 42a–e to represent a view 46a–e of the relational database 43. Consequently, each active data object 42a–e thinly encapsulates an associated relational row 47 of the relational database 43 for use by the business objects 41a–b in the middle tier. The business objects 41a–b interface to the active data objects 42a–e via APIs 45a–e and the application 40 interfaces to the business objects 41a–b via APIs 44a–b. Each active data object 42a–e passes queries in a DBMS-specific query language, such as SQL, to the relational database 43 and receives back the resultant relational rows 47 of data. The active data objects 42a–e store persistent attributes for their associated relational rows 47 and define an interface to the relational database 43.

The primary advantage of active data objects 42a–e is the abstraction provided to the application 40 since the application 40 is written to see only the resultant objects, that is, the business objects 41a–b. However, active data objects 42a–e provide no abstraction from the RDBMS engine in the bottom tier. Thus, the application 40 is tied to the query language and schema of the relational database 43. Moreover, active data objects 42a–e give up most of the power of the RDBMS query engine, such as used in summarizing data which has been mapped to a large number of active data objects 42a–e.

Figure 4:
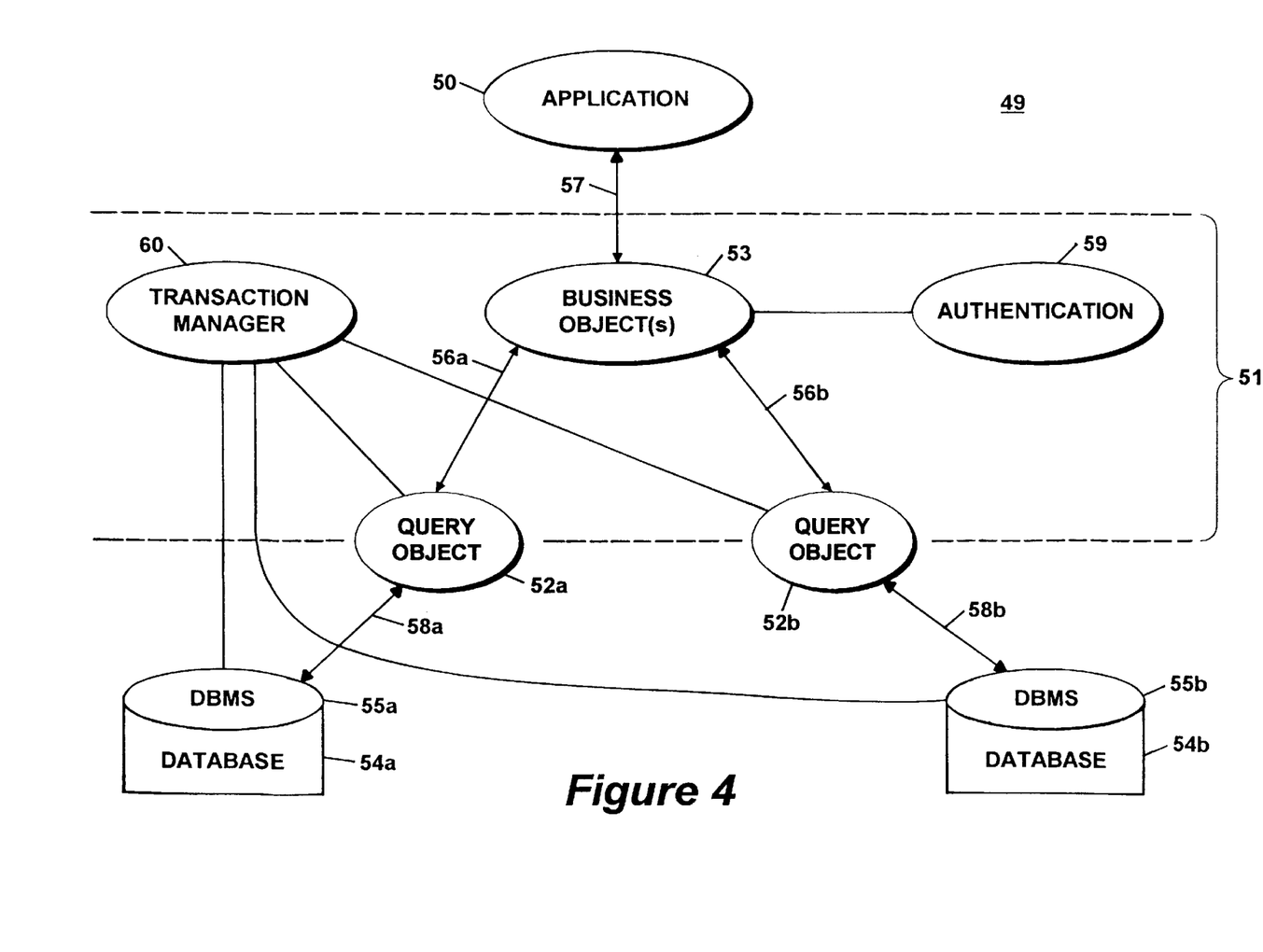
FIG. 4 is a block diagram of a database client/server environment using query objects according to the present invention implemented in the system of FIG. 1.

FIG. 4 is a block diagram of a database client/server environment 49 using query objects 52a–b according to the present invention implemented in the system 10 of FIG. 1. The environment 49 is functionally structured into three tiers. At the top tier, a client 11 (shown in FIG. 1) executes an application 50. In the middle tier 51, the business logic is implemented as one or more business objects 53 (only one business object 53 is shown) interfacing with query objects 52a–b. Both the business object 53 and query objects 52a–b can be executed on either a client 11 or a server 12 (shown in FIG. 1). Other combinations and configurations of objects, including business object 53 or query object 52a–b are feasible. In a further embodiment, an authorization object 59 authenticates requests from application 50 as further described below. Similarly, in a still further embodiment, a transaction manager object 60 manages transaction rollbacks and commits as further described below. At the bottom tier, a server 12 and an associated data source 14 (shown in FIG. 1) include database management systems (DBMSs) 55a–b being executed by the server 12 and their associated databases 54a–b. Query objects 52a–b allow the business logic implemented in the business objects 53 and the DBMSs 55a–b to work together.

Query objects 52a–b are server objects that translate client requests into appropriate queries, issue those queries and return the results. Functionally, each query object 52a–b creates a logical "wrapper" that encapsulates a specific, application-dependent set of queries and provides the results to its clients as strongly typed values. Each query object 52a–b provides the following:

(1) A DBMS-independent API 56a–b for accessing a database 54a–b.
(2) Connectivity to the DBMS 55a–b associated with the database 54a–b, including the location of the database 54a–b in the distributed environment and facilities for managing the connection resources.
(3) Multi-threading support, if necessary.
(4) Capability to handle specific DBMS APIs 58a–b and parameters for queries.

Figure 5:
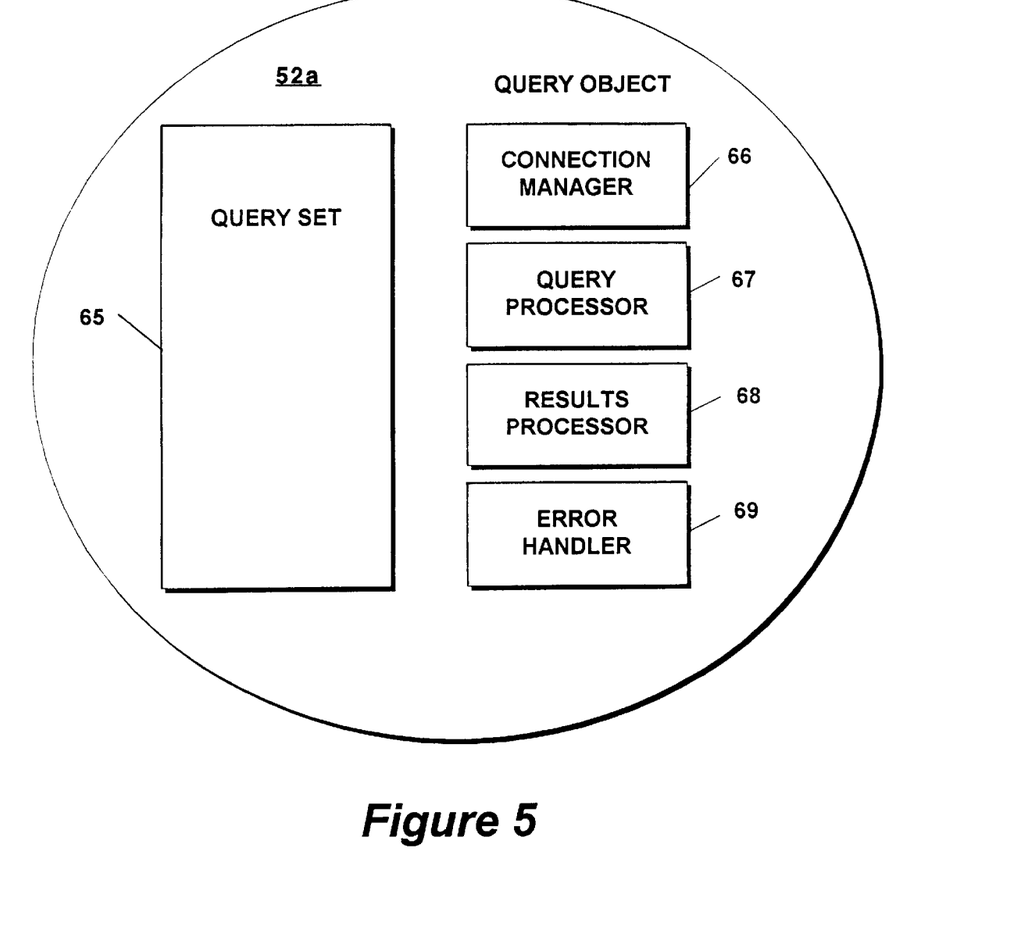
FIG. 5 is a block diagram of a query object used in the database client/server environment of FIG. 4.

FIG. 5 is a block diagram of one of the query objects 52a used in the database client/server environment 49 of FIG. 4. The query set 65 encapsulate a set of queries implemented in the query language. Each of the encapsulated queries conforms to the schema of the associated database 54a (shown in FIG. 4). A connection manager 66 handles a connection between the query object 52a and the database 54a via the portable API 56a. A query processor 67 performs one or more queries on the database 54a in response to a request from a client. An error handler 69 handles errors encountered by the connection manager 66 and the query processor 67 and communicates a pre-determined error message or indication to the client. Finally, a results processor 68 processes a resultant set of the data received in response to the queries and provides the resultant set as pre-determined data types to the client.

Referring back to FIG. 4, accessing data in the databases 54a–b is analogous to calling a library routine. A client of the query object 52a–b invokes methods on the reference to the query object and gets back results as strongly typed values according to the mapping for the host language in which the client is written. On the client side, each query object 52a–b exports a general client API 56a–b with which to exchange parametized requests and data with clients, including business objects 53 or other query objects 52a–b. The client API 56a–b provides a result type that is known at the time the query object 52a–b is generated. On the server side, each query object 58a–b exports a DBMS API 58a–b which interfaces in a DBMS-specific query language, such as SQL, to at least one DBMS 55a–b over a reusable connection.

The query objects 52a–b encapsulate expertise about the underlying database domains, including the query languages used, particular DBMS APIs, database schemas, handling of intermediate query results and a possibly non-trivial interpretation of results. Functionally, query objects 52a–b translate domain-specific questions and operations into the appropriate DBMS-specific queries that manipulate the databases 54a–b and provide results. The full power of the DBMSs 55a–b is available, including their sorting and indexing techniques and query language processors and optimizers since the queries work directly on the databases 54a–b themselves. Moreover, the query objects 52a–b can utilize knowledge about the particular DBMS engine being used and any special optimization tricks.

In the preferred embodiment, the client/server environment 49 is implemented in compliance with the Common Object Request Broker Architecture (CORBA), such as described in "The Common Object Request Broker: Architecture and Specification," Rev. 2.0, Object Management Group, Inc. (July 1995), the disclosure of which is incorporated herein by reference. The application 50, business object 53 and query objects 52a–b each export an API defined in Interface Definition Language (IDL) and interface with each other via an associated Object Request Broker (ORB) (not shown). Each query object 52a–b returns a set of IDL structures whose type is derived from the database schema at the time the query object 52a–b is implemented. The query objects 52a–b can interface various data sources, for example, object databases, such as licensed by Versant and ODI; relational databases, such as licensed by IBM (DB2), Oracle and Sybase; legacy data repositories, such as IBM's MQ series and CICS; and ordinary flat files.

II. Example

Figure 6:
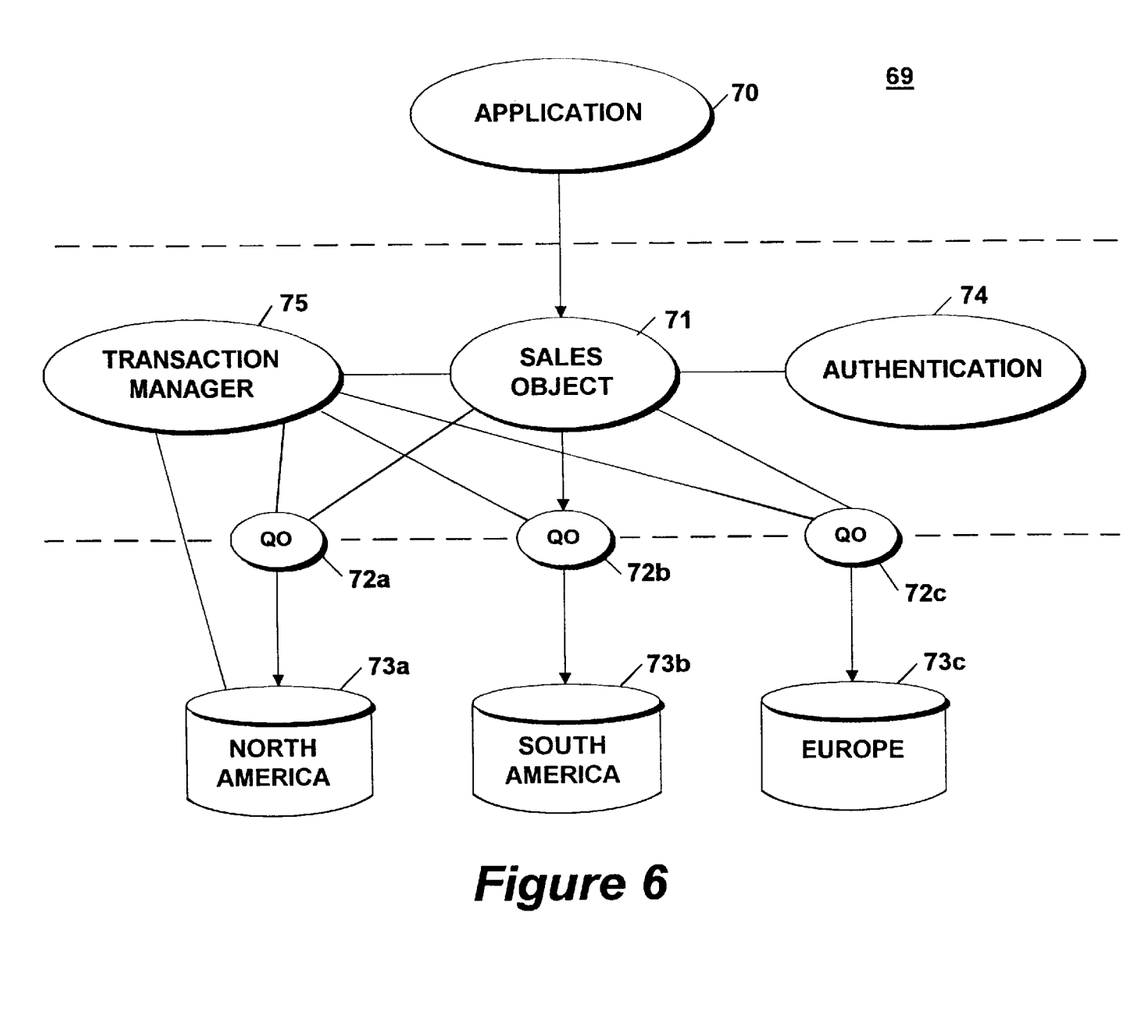
FIG. 6 shows, by way of example, a block diagram of a database transaction environment using query objects in the database client/server environment of FIG. 4.

FIG. 6 shows, by way of example, a block diagram of a database transaction environment 69 using query objects 72a–c in the database client/server environment 49 of FIG. 4. The example is described in the context of relational databases 73a–c using the SQL query language. However, the invention is not limited to relational databases and can operate on any data source as described hereinabove.

The example of FIG. 6 demonstrates the use of query objects 73a–c in interfacing to a set of databases 73a–c storing quarterly sales information organized by geographical region. Each database 73a–c is associated with a particular sales region, such as "North America," "South America" and "Europe." One query object 72a–c is associated with each regional database 73a–c. A single sales object 71 implements the business logic by handling individual calls to each query object 73a–c.

Functionally, an application 70 sends a request to a sales object 71 asking, for instance, "What were the sales of all products in North America during the first quarter?" In response to the sales object 71, the authentication object 75 authenticates the request and, if authenticated, the sales object 71 looks up each region in an internal table. The query is then processed by forwarding the request to the appropriate query objects 72a–c which each query their respective regional databases 73a–c. The results are returned to the application 70 via the query objects 72a–c and sales object 71. If necessary, the sales object 71 processes any intermediate results. The transaction manager 76 subsequently performs a database commit operation.

Pseudocode for the application 70 is shown in Example 1. An instance au of the Authentication object 74 is created. An instance ns of a Naming Service object (not shown) is created. A reference to the Naming Service (not shown) is found using the ORB and stored in ns. The ORB and Naming Service are CORBA services, such as further described in R. Orfali et al., "The Essential Client/Server Survival Guide," pp. 406–414, cited hereinabove. An instance ss of the sales object 71 is created. A reference to the sales object 71 is found using the ORB and stored in ss. An instance sr of a sales record object (not shown) is created. Finally, a query requesting all first quarter sales in North America is made to the sales object 71 with results stored in sr.

EXAMPLE 1

Application Pseudocode.

```
Authentication           au;    // create authentication object
NamingService            ns;    // store obj reference in ns
ns = find ("NameService");
SalesService             ss;    // store obj reference in ss
ss = ns.find ("Sales");
SalesRecord              sr;    // query db
sr = ss.GetSales (au, "Q1", "all",
"North America");
```

Pseudocode for the sales object 71 is shown in Example 2. If the query asks for all sales regions, the sales object 71 iteratively looks up the query object 72a–c reference for each region from an internal table and issues a query to that query object. Once all query objects 72a–c have been examined, the resultant data is merged together and returned. Otherwise, if the query only asks for one sales region, the sales object 71 just looks up the appropriate query object 72a–c for that region and issues a query to that query object. The resultant data is returned.

EXAMPLE 2

Sales Object Pseudocode.

```
getSales (auth, quarter, product, region)
{
authenticate application using auth;
if region = "all"                    // process query for all regions
for each region do                   // loop thru each region
lookup QueryObject reference;
call QueryObject.getSales
(auth, quarter, product);
merge all data together;
else                                 // process query for one region
lookup QueryObject reference for region;
call QueryObject.getSales
(auth, quarter, product);
endif;
return;
}
```

In a further embodiment, an authentication object 74 authenticates requests received from applications 70 using the authentication record auth. Authentication enables the business logic (in this example, a sales object 71) to recognize the sender. Functionally, the login information stored in the auth record is compared to an internal table (not shown). Three forms of authentication can be used. Client principal authentication passes an authentication object through to a server for actual processing. Server principal authentication is used by a server which maintains login information. Generally, servers use one general purpose login for the database and separate logins for each user. Finally, the ORB can implicitly perform authentication using the Security Service which is a CORBA service, such as further described in R. Orfali et al., "The Essential Client/Server Survival Guide," pp. 406–414, cited hereinabove.

Pseudocode for each of the query objects 73a–c is shown in Example 3. The query object 73a–c first obtains or reuses a connection to its associated DBMS 73a–c. The input parameters, quarter and product, are bound to the arguments for the database query and the database query is issued. The results are processed, if necessary, iteratively. Finally, the connection is marked as unused and the results returned to the sales object 71.

EXAMPLE 3

Query Object Pseudocode.

```
getSales (auth, quarter, product)
{
conn = GetOrReuseConnection (auth);    //
connect w/DBMS
bindArgs (quarter, product);           //
form query
doQuery ("Select . . .                 //
issue query
from . . .
where . . .");
while (more results() ) do             //
proc results
collect results;
mark connection as unused;
return results;
}
```

In a still further embodiment, each query object 72a–c performs some form of transaction handling or finalization technique. Generally, two forms of transaction handling are employed: single statement and multi-statement. Single statement transactions are database modifications committed only during the course of the call. Multi-statement transactions are either explicitly committed (or rolled back) or left remaining open with the committal left to a transaction manager 75, such as by using the Transaction Service which is a CORBA service, such as further described in R. Orfali et al., "The Essential Client/Server Survival Guide," pp. 406–414, cited hereinabove.

Figure 7:
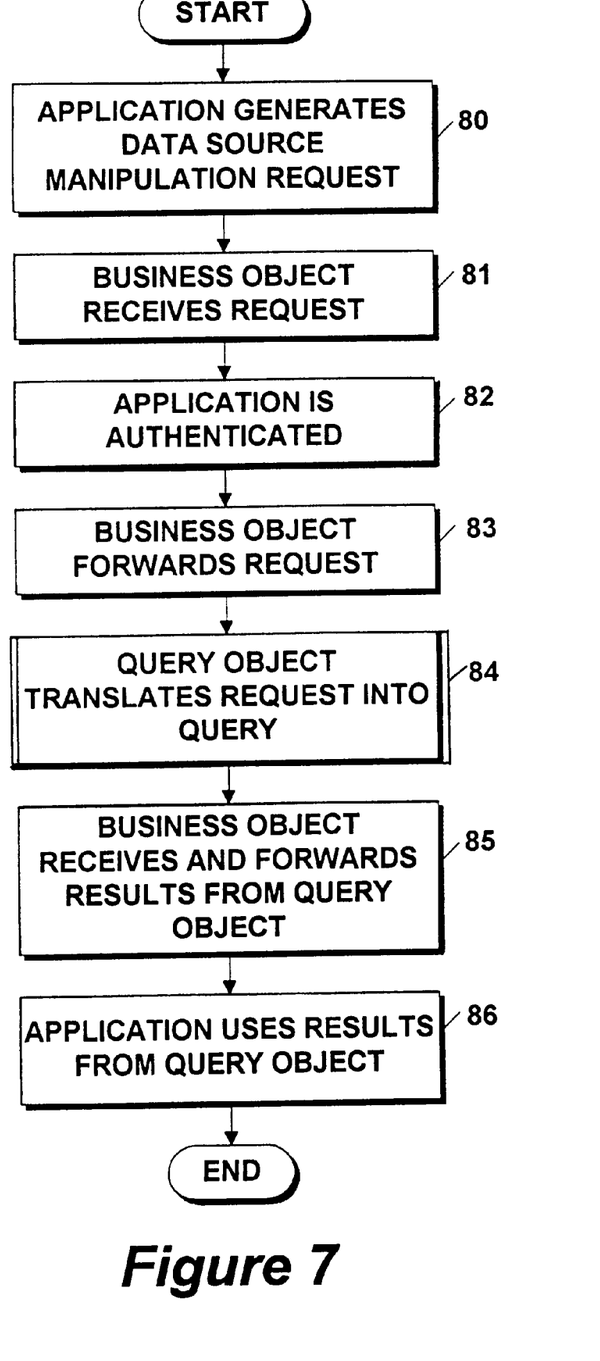
FIG. 7 is a flow diagram of a process for providing improved database interfacing using query objects in the environment of FIG. 4 according to the present invention.

III. Process for Providing Improved Database Interfacing Using Query Objects FIG. 7 is a flow diagram of a process for providing improved database interfacing using query objects 52a–b according to the present invention in the environment 49 of FIG. 4. The process is illustrated and described as a series of process steps. As would be clear to one skilled in the art, the process steps can be embodied as code for a computer program for operation on a conventional programmed digital computer, such as client 11 and server 12 (shown in FIG. 1). The program code can be embodied as a computer program on a computer-readable storage medium or as a computer data signal in a carrier wave transmitted over network 13.

The purpose of the process is to encapsulate expert knowledge about the query language, DBMS API and database schema using a server object that translates business logic calls into appropriate queries, issues those queries and returns the results. First, the application 50 generates a data source manipulation request in the form of a high-level query to an unspecified data source (block 80) which is received by a business object 53 (block 81). In the described embodiment, the request is expressed in IDL, although any commonly understood language or convention conforming to the application-business object API could be used, such as the Java programming language. In the further embodiment, the request is authenticated by the business object 53, such as by using the authentication object 59 (block 82). The business object 53 forwards the request to the appropriate query objects 52a–b (block 83). In the described embodiment, the request is also expressed in IDL, although any commonly understood language or convention conforming to the business object-query object API could be used, such as the Java programming language. Each recipient query object 52a–b translates the request into a DBMS-specific query (block 84), as further described hereinbelow with reference to FIG. 8. Upon completion of the query, the results are received from the query objects 52a–b by the business object 53 and forwarded to the application 50 (block 85). Finally, the application 50 uses the results (block 86).

Figure 8:
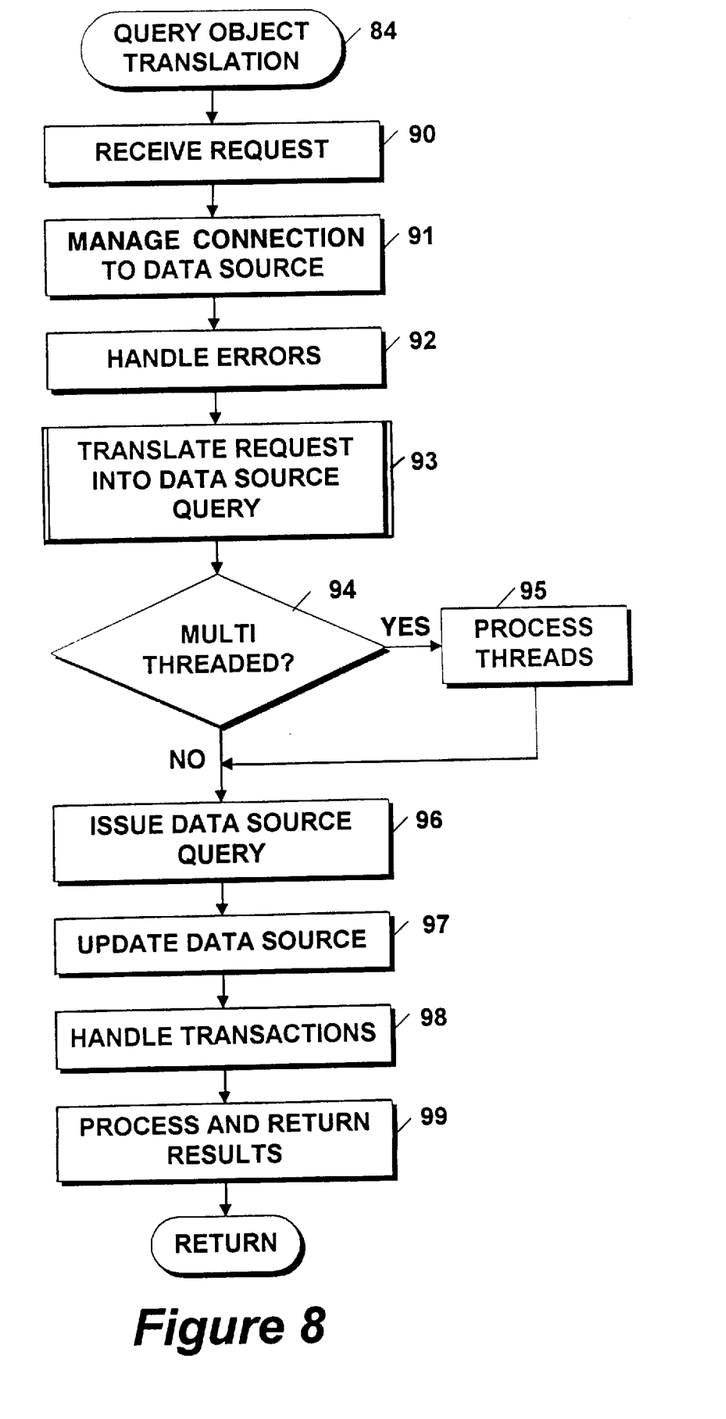
FIG. 8 is a flow diagram of a routine for performing a query object translation used by the process of FIG. 7.

FIG. 8 is a flow diagram of the routine 84 for performing a query object translation used by the process of FIG. 7. Its purpose is to translate a request received from a client, issue the request and return the results. With reference to the present routine 84, a "client" refers to either a business object 53, query object 52a–b or other object sending a request in conformity with the API of the query object 52a–b. First, the query object 52a–b receives the request from the client (block 90). The connection between the query object 52a–b and its associated DBMS 55a–b is managed, including obtaining, reusing and releasing (block 91). Any errors encountered are handled by communicating a predetermined error message or indication to the client, both with explicit error handling routines (not shown) or implicitly, such as via an interrupt routine handled by the ORB (block 92). The request is translated into a data source-specific query (block 93), as further described hereinbelow with reference to FIG. 9. If the DBMS 55a–b offers multi-threaded operation (block 94), multiple control threads are processed (block 95). One approach to handling multi-threading in a distributed object operating environment is described in the U.S. patent application entitled "Methods and Apparatus For Managing a Database in a Distributed Object Operating Environment," Ser. No. 08/414,119, pending, the disclosure of which is incorporated herein by reference. The query is issued to the database 54a–b (block 96) and any updates to the data source are performed (block 97). In the still further embodiment, the transactions are handled (block 98). Finally, the results are processed and returned to the client (block 99), as further described hereinbelow with reference to FIG. 10.

Figure 9:
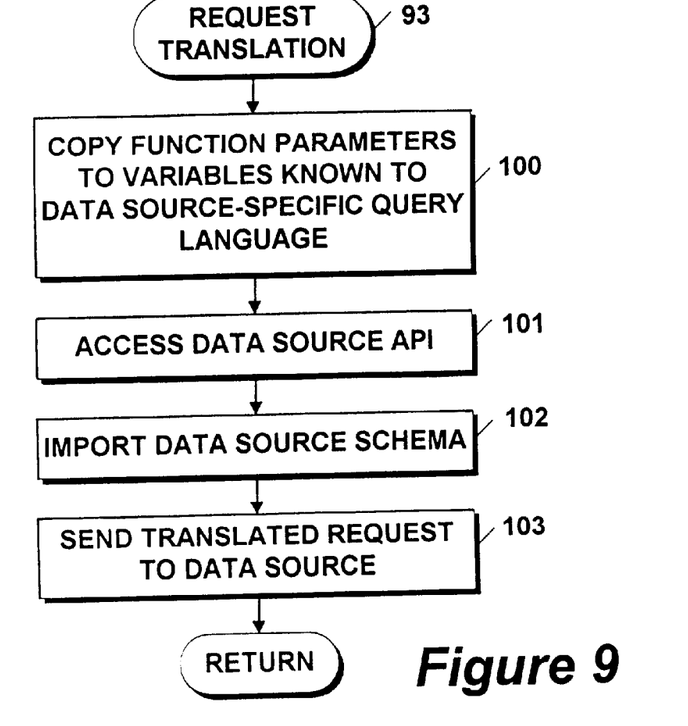
FIG. 9 is a flow diagram of a routine for translating a request used by the routine of FIG. 8.

FIG. 9 is a flow diagram of the routine 93 for translating a request used by the routine of FIG. 8. Its purpose is to bind the input parameters received from the client and form a data-source specific query request. First, the input function parameters are copied to variables known to the data source-specific query language (block 100). The API for the data source is accessed (block 101) and the data source schema is imported into the query object 52a–b (block 102). The API and schema are used to formulate a syntactically correct query for the DBMS 55a–b. Finally, the translated request is sent to the data source (block 103).

Figure 10:
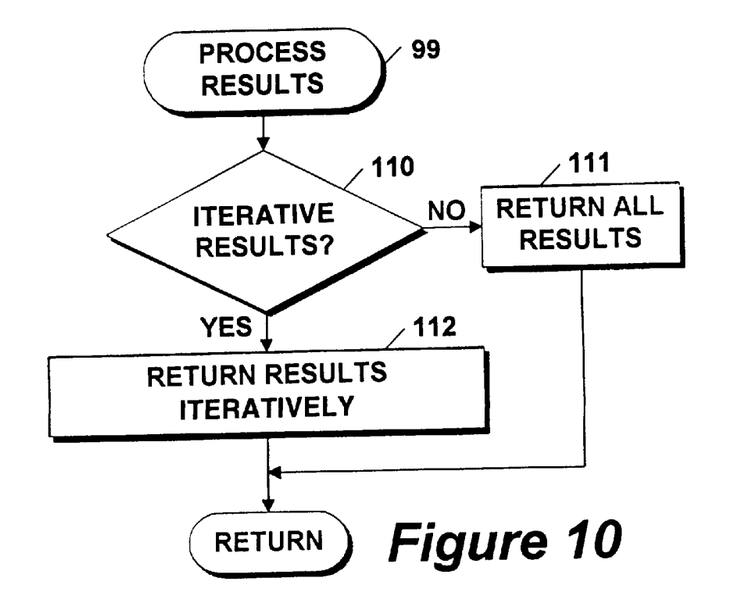
FIG. 10 is a flow diagram of a routine for processing results used by the routine of FIG. 8.

FIG. 10 is a flow diagram of the routine 99 for processing results used by the routine of FIG. 8. Its purpose is to iteratively process any intermediate results received from the database 54a–b. If the results are iterative (block 110), the results are returned iteratively to the client (block 112). Otherwise, all of the results are returned at once (block 111).

Compared to the prior art approaches to interfacing applications to databases in a three-tiered model, query objects present several unique advantages. First, query objects encapsulate the database query language and the specifics required to access the databases so that the clients do not have to know the DBMS details. Second, query objects encapsulate the particular database schema and thus isolate the clients from schema changes made at the bottom tier, provided that the query objects are modified accordingly. Consequently, an application can migrate from one DBMS to another and from one data schema to another without impacting the business logic of the application. Third, query objects encapsulate the use of the particular DBMS API and present a DBMS-independent interface accessed via parametized requests. Since query objects are generated automatically, clients that rely on them can take advantage of emerging technological improvements by simply regenerating their query objects, thereby preserving the IDL interface but upgrading the implementation. Finally, query objects bypass the data object layer, thereby avoiding the need to map data into active data objects. This feature can have several performance advantages, especially when the number of objects that must be examined by the query is large.

While the invention has been particularly shown and described with reference to embodiments thereof, those skilled in the art will understand that the foregoing and other changes in form and detail may be made therein without departing from the spirit and scope of the present invention.

What is claimed is:

1. A system for providing improved interfacing to a data source, the data source comprising a schema describing organization of the data within the data source and a interface defined in a query language, the system comprising:

a query obiect configured to store and retrieve data from the data source, the query object comprising:
      a set of data manipulations encapsulated in the query object and implemented in the query language, each such encapsulated data manipulation conforming to the schema of the data source;

a connection manager encapsulated in the query object for handling a connection via the interface between the query object and the data source;

a query processor encapsulated in the query object for performing at least one such encapsulated data manipulation on the data source in response to a request from a client; and a results processor encapsulated in the query object for processing a resultant set of the data received in response to the at least one such data manipulation form the data source and providing the resultant set of the data as pre-determined data types to the client.

2. A system according to claim 1, wherein the request further comprises a parametized request, the query processor accessing the data source via the parametized request.

3. A system according to claim 1, further comprising an error handler handling errors encountered by the connection manager and the query processor, each such error sending a pre-determined error indication to the client.

4. A process according to claim 1, wherein the query processor handles transactions subsequent to performing at least one such encapsulated data manipulation.

5. A system according to claim 4, wherein the query processor handles transactions by caling a single statement transaction implemented in the query language.

6. A system according to claim 4, wherein the query processor handles transactions by calling an explicit transaction operation implemented in the query language.

7. A system according to claim 4, wherein the query processor handles transactions by invoking a transaction manager which interfaces with the query object via the interface.

8. A system according to claim 1, wherein the query processor processes a plurality of threads, each such thread controlling at least one such encapsulated data manipulation on the data source.

9. A system according to claim 1, wherein the query processor maps the request from the client to an intermediate data format.

10. A system according to claim 1, wherein the query processor maps the resultant set of the data into an intermediate data format.

11. A system according to claim 1, wherein the data source operates in a distributed processing environment comprising a plurality of the query objects.

12. A process for providing improved interfacing to a data source, the data source comprising a schema describing organization of the data within the data source and a interface defined in a query language, the process comprising:

providing a query object having encapsulated therein a set of data manipulations implemented in the query language, each such encapsulated data manipulation conforming to the schema of the data source;

handling a connection via the interface between the query object and the data source using a connection manager encapsulated within the query object;

performing at least one such encapsulated data manipulation on the data source in response to a request from a client using a query processor encapsulated within the query object; and processing a resultant set of the data received in response to the at least one such data manipulation form the data source using a results processor encapsulated within the query object; and providing the resultant set of the data as pre-determined data types to the client using the results processor encapsulated within the query object.

13. A process according to claim 12, wherein the request further comprises a parametized request, the step of performing at least one such encapsulated data manipulation further comprising the step of accessing the data source via the parametized request.

14. A process according to claim 12, further comprising the step of handling errors encountered during the steps of handling a connection and performing at least one such encapsulated data manipulation, each such error sending a pre-determined error indication to the client.

15. A process according to claim 12, further comprising the step of handling transactions subsequent to the step of performing at least one such encapsulated data manipulation.

16. A process according to claim 15, wherein the step of handling transactions further comprises the step of calling a single statement transaction implemented in the query language.

17. A process according to claim 15, wherein the step of handling transactions further comprises the step of calling an explicit transaction operation implemented in the query language.

18. A process according to claim 17, wherein the explicit transaction operation further comprises the step of performing at least one of a commit statement and a rollback statement.

19. A process according to claim 15, wherein the step of handling transactions further comprises the step of invoking a transaction manager which interfaces with the query object via the interface.

20. A process according to claim 12, further comprising the step of processing a plurality of threads, each such thread controlling at least one such encapsulated data manipulation on the data source.

21. A process according to claim 12, further comprising the step of mapping the request from the client to an intermediate data format.

22. A process according to claim 21, wherein the intermediate data format comprises an interface definition language, the process further comprising the step of converting the request from the client into the interface definition language.

23. A process according to claim 12, further comprising the step of mapping the resultant set of the data into an intermediate data format.

24. A process according to claim 23, wherein the intermediate data format comprises the query language of the data source, the process further comprising the step of converting the resultant set of the data into the query language.

25. A process according to claim 12, wherein the data source operates in a distributed processing environment comprising a plurality of the query objects.

26. A computer program product embodied on a computer-readable medium for providing improved interfacing to a data source, the data source comprising a schema describing organization of the data within the data source and a interface defined in a query language, the computer program product comprising:

code for providing a query object having encapsulated therein a set of data manipulations implemented in the query language, each such encapsulated data manipulation conforming to the schema of the data source;

code for handling a connection via the interface between the query object and the data source using a connection manager encapsulated within the query object;

code for performing at least one such encapsulated data manipulation on the data source in response to a request from a client using a query processor encapsulated within the query object; and code for processing a resultant set of the data received in response to the at least one such data manipulation form the data source using a results processor encapsulated within the query object; and code for providing the resultant set of the data as pre-determined data types to the client using the results processor encapsulated within the query obiect.

27. A computer program according to claim 26, wherein the request further comprises a parametized request, the code for performing at least one such encapsulated data manipulation further comprising code for accessing the data source via the parametized request.

28. A computer program according to claim 26, further comprising code for handling errors encountered during handling a connection and performing at least one such encapsulated data manipulation, each such error sending a pre-determined error indication to the client.

29. A computer program according to claim 26, further comprising code for handling transactions subsequent to the code for performing at least one such encapsulated data manipulation.

30. A computer program according to claim 26, further comprising code for processing a plurality of threads, each such thread controlling at least one such encapsulated data manipulation on the data source.

31. A computer program according to claim 26, further comprising code for mapping the request from the client to an intermediate data format.

32. A computer program according to claim 31, wherein the intermediate data format comprises an interface definition language, the computer-readable medium further comprising code for converting the request from the client into the interface definition language.

33. A computer program according to claim 26, further comprising code for mapping the resultant set of the data into an intermediate data format.

34. A computer program according to claim 33, wherein the intermediate data format comprises the query language of the data source, the computer-readable medium further comprising code for converting the resultant set of the data into the query language.

35. A computer data signal embodied in a carrier wave for providing improved interfacing to a data source, the data source comprising a schema describing organization of the data within the data source and a interface defined in a query language, the computer data signal comprising:

code for providing a query object having encapsulated therein a set of data manipulations implemented in the query language, each such encapsulated data manipulation conforming to the schema of the data source;

code for handling a connection via the interface between the query object and the data source using a connection manager encapsulated within the query object;

code for performing at least one such encapsulated data manipulation on the data source in response to a request from a client using a query processor encapsulated within the query object; and code for processing a resultant set of the data received in response to the at least one such data manipulation form the data source using a results processor encapsulated within the query object; and code for providing the resultant set of the data as pre-determined data types to the client using the results processor encapsulated within the query object.

* * * * *